United States Patent [19]
Kerstein et al.

[11] Patent Number: 5,483,936
[45] Date of Patent: Jan. 16, 1996

[54] SPARK KNOCK DETECTION SYSTEM FOR AN INTERNAL COMBUSTION ENGINE

[76] Inventors: Scott M. Kerstein, 16557 Lexington, Redford, Mich. 48240; Stephen C. Simmons, 12449 W. Dunbar, Dundee, Mich. 48131; Brett A. Dunn, 384 S. Harris, Saline, Mich. 48176; Duane M. Grider, 21672 Sheffield, Farmington Hills, Mich. 48335

[21] Appl. No.: 270,982

[22] Filed: Jul. 5, 1994

[51] Int. Cl.$^6$ ............................ F02P 5/152; G01L 23/22
[52] U.S. Cl. ................... 123/425; 73/35.04; 364/431.08
[58] Field of Search ............................. 123/425, 435; 73/35; 364/431.08

[56] References Cited

U.S. PATENT DOCUMENTS

| | | | |
|---|---|---|---|
| 4,356,551 | 10/1982 | Iwase et al. | 123/425 |
| 4,424,704 | 1/1984 | Yamamoto et al. | 73/35 |
| 4,429,565 | 2/1984 | Utsumi et al. | 73/35 |
| 4,584,869 | 4/1986 | Frodsham | 73/35 |
| 4,593,553 | 6/1986 | Bonitz et al. | 73/35 |
| 4,617,895 | 10/1986 | Sakakibara et al. | 123/425 |
| 4,658,650 | 4/1987 | Yorinaga et al. | 73/654 |
| 4,699,106 | 10/1987 | Haraguchi et al. | 123/425 |
| 4,711,212 | 12/1987 | Haraguchi et al. | 123/425 |
| 4,711,213 | 12/1987 | Sakakibara et al. | 123/425 |
| 4,711,214 | 12/1987 | Sakakibara et al. | 123/425 |
| 4,770,144 | 9/1988 | Sakakibara et al. | 123/425 |
| 4,899,710 | 2/1990 | Takahashi | 123/425 |
| 4,991,553 | 2/1991 | Kurihara et al. | 123/425 |
| 4,993,387 | 2/1991 | Sakakibara et al. | 123/425 |
| 5,041,976 | 8/1991 | Marko et al. | 364/424.03 |
| 5,054,448 | 10/1991 | Matsuoka et al. | 123/425 |
| 5,101,790 | 4/1992 | Takasu et al. | 123/425 |
| 5,115,779 | 5/1992 | Itoyama | 123/425 |
| 5,134,980 | 8/1992 | Sakakibara et al. | 123/425 |
| 5,186,145 | 2/1983 | Sakakibara | 123/425 |
| 5,188,080 | 2/1993 | Sakakibara et al. | 123/425 |
| 5,193,513 | 3/1993 | Marko et al. | 123/571 |
| 5,201,292 | 4/1993 | Grajski et al. | 123/425 |
| 5,215,058 | 6/1993 | Sakakibara et al. | 123/425 |
| 5,230,316 | 7/1993 | Ichihara et al. | 123/425 |
| 5,394,330 | 2/1995 | Horner | 73/35 |

FOREIGN PATENT DOCUMENTS 0454486  10/1991  European Pat. Off. ............... 73/35

OTHER PUBLICATIONS

Geoffrey E. Hinton, "How Neural Networks Learn From Experience" Scientific American Sep. 1992.
Bart Kosko and Satoru Isaka "Fuzzy Logic", Scientific American, Jul. 1993.

*Primary Examiner*—Andrew M. Dolinar

[57] ABSTRACT

A spark knock detection system is disclosed which has a vibration detector connected in proximity to the engine for converting a vibration into an electrical output signal representative of the vibration. A sampler which is connected to the vibration detector samples the electrical output signal and converts the electrical output signal into a numerical data pattern corresponding to the electrical output signal. A feature extractor which is connected to the sampler converts the numerical data pattern into frequency domain signal portions which have a magnitude. A classifier which is connected to the feature extractor receives the frequency domain signal portions. The classifier has predetermined coefficients for classifying the frequency domain signal portions to indicate the presence of spark knock.

20 Claims, 2 Drawing Sheets

SPARK KNOCK DETECTION SYSTEM FOR AN INTERNAL COMBUSTION ENGINE

BACKGROUND OF THE INVENTION

The present invention relates generally to internal combustion engines and more specifically to an apparatus for recognizing spark knock during the operation of the engine.

Spark knock is the phenomenon that occurs when a combustion flame in a cylinder of an engine propagates near the speed of sound. If knock is left uncontrolled, engine damage may occur and emissions levels may increase. Many engine control strategies have developed to remedy spark knock. For example, retarding the ignition point and making the air fuel mixture richer are both strategies employed to reduce spark knock.

Accurate detection of spark knock is essential to the durability of an internal combustion engine. Previously, there have been several attempts at accurately determining spark knock. Commonly, systems for determining spark knock use a peak detection-type configuration which compares a vibration signal from an engine sensor to a predetermined threshold. However, such systems have proved unreliable due to increased mechanical and electrical noise in the engine compartment especially at high engine speeds. Increased mechanical and electrical noise decreases the signal-to-noise ratio, making accurate detection difficult. Such systems also have proven to be unreliable in the long term because the threshold values are determined for new engines. Prior art thresholds do not compensate for aging of an engine, causing a generally decreasing detection during the life cycle of the engine.

One method of spark knock detection using a threshold is disclosed in U.S. Pat. No. 5,201,292. The '292 patent describes a spark knock detection system which breaks the signal up into energy components and spectral components. Each portion is compared to predetermined thresholds. If the energy component signal or spectral component exceeds its corresponding threshold then there is knock. However, even if the thresholds are adaptively predetermined, the system may very well give errors based on the system noise particularly when the vehicle is running at high RPM. In other words, if the noise peak rises above a predetermined threshold then a knock signal is detected. Another source of error in such a system is if a rock hits the oil pan or other engine component. The noise produced may be determined as a spark knock. Such a system is believed detect an undesirable number of errors.

It would therefore be desirable provide a system with a having a high accuracy rate at all portions of the life cycle of an engine.

SUMMARY OF THE INVENTION

One advantage of the present invention is that an individual vibration sensor output can be analyzed to give the degree of knock which results in a more accurate correction to the engine control strategy.

Another advantage is that the whole acoustic signature of spark knock is analyzed which improves the accuracy of the spark knock determination.

The present invention has a vibration detection means connected in proximity to the engine for converting a vibration into an electrical output signal representative of the vibration. A sampling means which is connected to the vibration detection means samples the electrical output signal and converts the electrical output signal into a numerical data pattern corresponding to the electrical output signal. A feature extraction means which is connected to the sampling means converts the numerical data pattern into frequency domain signal portions each having a magnitude. A classification means which is connected to the feature extraction means receives the frequency domain signal portions. The classification means has predetermined coefficients for classifying the frequency domain signal portions to indicate the presence of spark knock.

DETAILED DESCRIPTION OF THE PREFERRED EMBODIMENT

Figure 1:
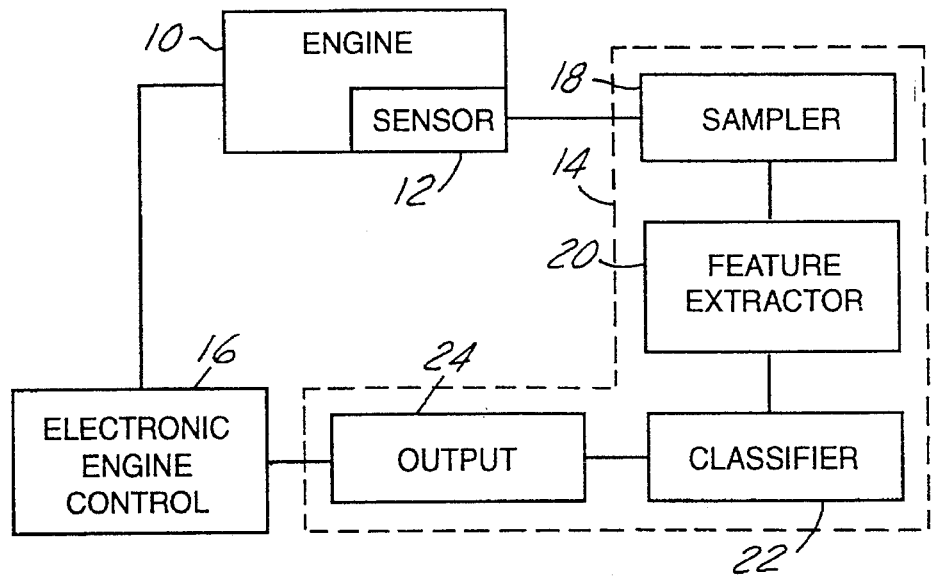
FIG. 1 is a block diagram of a spark knock detection system according to the present invention.

Referring to FIG. 1, the function of spark knock detection in an internal combustion engine 10 is monitored by a spark knock detection system 14 according to the present invention. Spark knock detection system 14 receives a signal from sensor 12 to determine the degree of spark knock. Spark knock detection system 14 provides an output signal to an electronic engine controller 16 which adjusts the operating parameters of engine 10 reduce the occurrence of spark knock.

Spark knock manifests itself in a vibration (i.e., a ringing) in the block of engine 10 in a particular frequency range. Input sensor 12 is used to convert the vibration of engine 10 into an analog electrical signal. The location of sensor 12 can be either physically on engine 10 or in close proximity to engine 10, as long as it is vibrational coupled. In one configuration, sensor 12 is comprised of a plurality of sensors, each mounted directly to the engine block adjacent a respective cylinder. However, this configuration is cost prohibitive in many applications. Alternatively, one sensor may be used per cylinder bank or one sensor may be used per engine.

The physical location of sensor 12 within engine 10 varies depending on the physical characteristics of engine 10 and the number of sensors provided. Every engine type transmits ringing throughout the engine block in different ways due to the physical mass and geometry of the engine block itself. Sensor 12 is optimally located in a position to receive the greatest amplitude of spark knock vibration. Other possible locations of sensor 12 include the oil pan, near a cylinder wall in the water jacket of engine 10 or in the cylinder itself.

Sensor 12 is a commonly known sensor which converts vibrations into an analog electrical signal. Examples of such sensors include an accelerometer, an acoustic sensor, a pressure sensor, or stress/strain sensor. These sensors come in many forms such as piezoelectric, capacitive, broad, medium or narrow band, directional, and omni-directional. In one implementation a piezoelectric sensor was found to give desirable results. These sensors can have a linear type output and resonant type output. A linear type output gives a response over a broad frequency span, where as a resonant sensor would provide an output only over a narrow frequency band.

Spark knock detection system 14 has a sampler 18, a feature extractor 20, a classifier 22, and an output generator 24.

Sampler 18 receives the analog electrical signal from sensor 12 and converts the signal into digital data. Preferably, sampler 18 continuously samples the analog signal from sensor 12 rather than looking only at a particular time window to prevent missing a spark knock event which falls between windows. The frequency of sampling is preferably fixed, for example, at 1024 Hz or integer multiples thereof. The frequency may also be continuously variable, for example between 1024 Hz and 4096 Hz. Increasing the sampling rate is particularly useful when the engine is at high RPM since more electrical and mechanical noise is generated at higher RPM. Increasing the sampling rate reduces error in the spark knock determination by reducing the effect of electrical and mechanical noise introduced into the system. The rate of sampling must be chosen so that the system can make the spark knock determination as rapidly as possible. Too many sampled data points will slow down the processing time of the system.

Feature extractor 20 receives the numerical data from sampler 18 and converts it into a usable form for processing. Feature extractor 20 is used to obtain frequency domain data using commonly known data processing techniques. Preferably, feature extractor 20 uses a fast fourier transform, a discrete fourier transform or wavelets to give the power spectrum density which contains frequency and magnitude information. The magnitude and frequency signal corresponding to spark knock varies depending on the engine type. The frequency and magnitude data provides a fingerprint of the sensor signal which is later classified as to whether and to what severity spark knock is occurring. Classifier 22 continuously receives the frequency and magnitude data from feature extractor 20 and determines whether spark knock is present in the system by looking at a predetermined number of prior data points. The number of data points used in the classification is typically a number which corresponds to the length of a power stroke in the individual engine. Classifier 22 preferably uses either an artificial neural network, fuzzy logic or a combination of the two. For example, a neural network may contain fuzzy logic, or the neural network may be placed in series with the fuzzy logic. Classifier 22 is trained to recognize an acoustic signature of spark knock based on a series of preset internal weights which correspond to different portions of the received signal. Weights are multiplied and interpolated using the magnitude of signal portion received from feature extractor 20 to obtain a weighted calculation. The weighted calculation is compared to predetermined values to determine the presence and severity of knock.

Output generator 24 receives information from classifier 22 and provides an output signal to the electronic engine control 16 based on the weighted calculation. Output generator 24 can be configured to provide a variety of types of output signals to electronic engine control 16 depending on the capabilities of the inputs to electronic engine output 16. For example, the output signal from output generator 24 to the input of electronic engine control 16 can be either an analog signal, a digital signal a frequency based signal, pulse width modulated signal, a parallel, or a serial signal.

If an analog output is provided, the severity of knock is represented by the magnitude of an AC or DC voltage. The output can be configured in a variety of ways. For example, if the output generator had a 0 to 5 volt AC output the sensor could be configured as follows:

| | |
|---|---|
| 0.0 VAC | Sensor Failure |
| 1.0 VAC | 0% Knock Occurrence |
| 3.0 VAC | 50% Knock Occurrence |
| 5.0 VAC | 100% Knock Occurrence |

Several variations to such a system include increasing the voltage span or reducing the output to span a greater voltage or the percentage breakdown in smaller increments.

If a digital output is provided, output generator provides a knock, no-knock indication. An output voltage of 5 volts represents a knock condition. An output voltage of 0 volts represents a no-knock condition. The polarity of the voltages may also be reversed.

If a frequency output is provided, the severity of knock is indicated by the modulated of the output signal. The duty cycle in such a configuration is constant (preferably a 50% duty cycle). For example, a designated frequency span between 50 and 150 Hz may have 50 Hz representing 0% knock and 150 Hz representing 100% knock. If the output is linear, 100 Hz represents 50% knock.

A pulse width modulated output is another alternative for the output. In such a configuration the pulse width of the signal corresponds to the severity of knock. For example, if the pulse width varies between 1 and 5 msec, 1 msec represents 0% knock and 5 msec represents 100% knock. If the configuration is linear, a pulse width of 3 msec represents 50% knock.

If the output generator is configured as a serial or parallel output, the severity of knock is encoded in a digital signal between a pair of start and stop bits as would be commonly known to those in the art. Preferably, the encoded signal would correspond to a standard protocol format. A serial or parallel output configuration is particularly useful for interfacing with external diagnostic devices. For example, information from a particular cylinder or cylinder bank can be analyzed.

Figure 2:
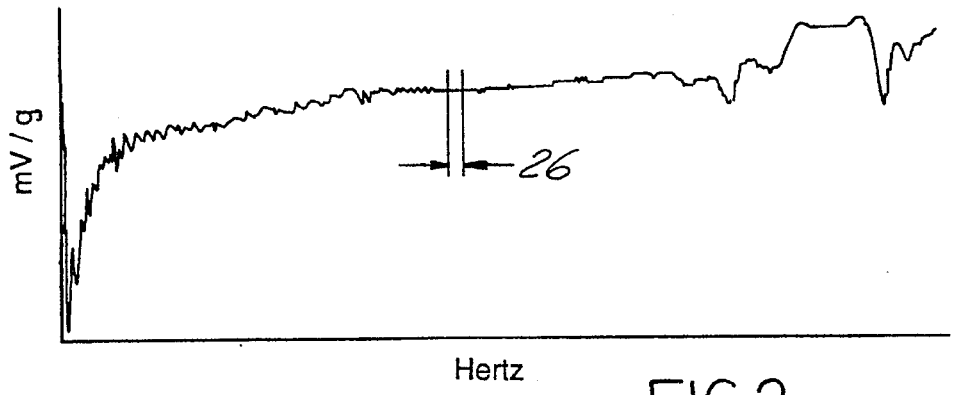
FIG. 2 is a graph representing an output of a knock sensor.

Referring now to FIG. 2, a representation of an output signal from a sensor is shown from a linear type knock signal, however a resonant type knock sensor signal may also be used. The signal shown is in terms of millivolts/ gravity versus frequency in hertz. The signal is sampled by sampler 18 at intervals 26 as shown. Intervals 26 are constant if a constant sampling frequency is used, but the intervals may be variable if a variable sampling frequency is used. Classifier 22 assigns weights to each portion of the signal and multiplies these weights by the signal magnitude for each sampled portion in the determination of the presence of spark knock.

Figure 3:
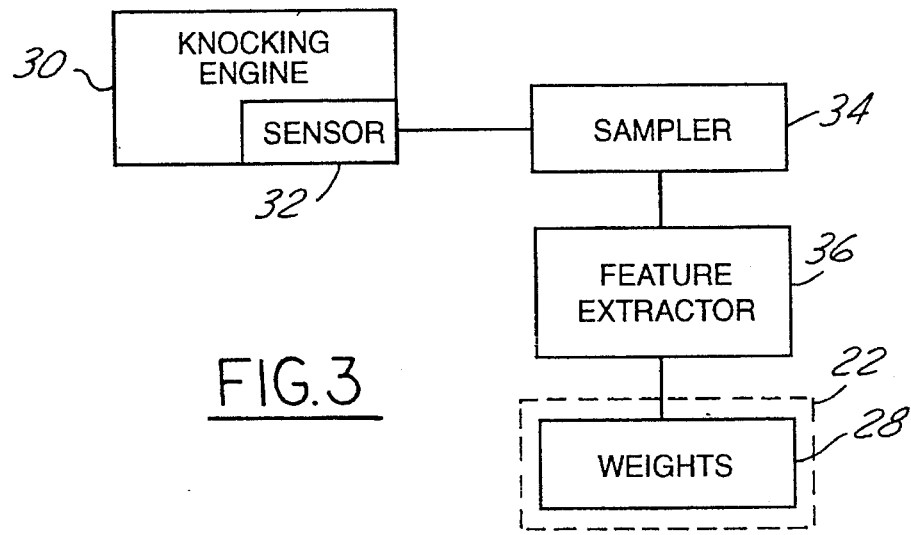
FIG. 3 is a block diagram of a knock detection system weight determination device.

Referring now to FIG. 3, internal weights 28 which are used in classifier 29 for spark knock determination are determined by providing a series of engines 30 exhibiting different severities spark knock. These engines are preferably of the same type but are at different stages of their life cycles so as to provide the system with the broadest range of knocking characteristics. A sensor 32, sampler 34 and a feature extractor 36 perform the same function as in FIG. 1 but can be a separate unit from that of FIG. 1. Over time, the internal weights are recursively adjusted until the weights determine spark knock within a desired value of percentage of correct determinations. The wider the variety of engines, engine conditions and spark knock severity provided while determining weights, the closer the system will be to determining knock at 100 percent accuracy. A system according to the foregoing description has correctly determined spark knock at 90–95 percent. Prior art systems are typically 50–60 percent accurate.

Figure 4:
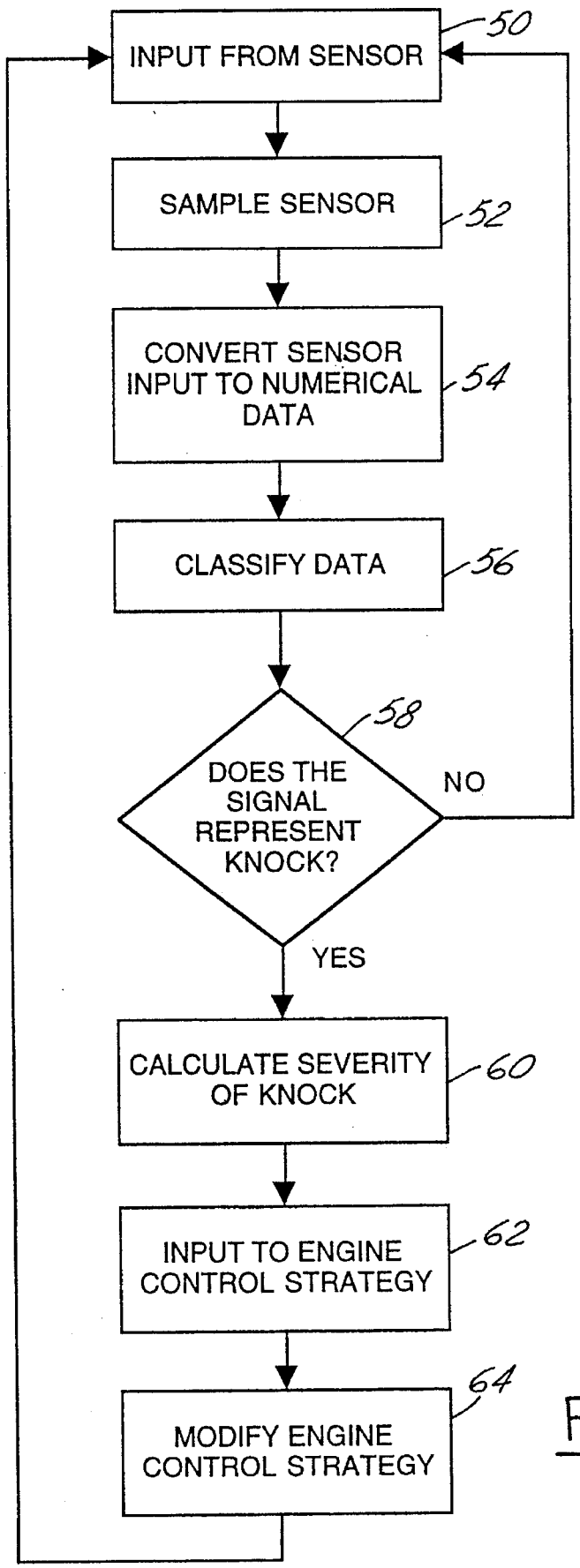
FIG. 4 is a flowchart of the spark knock determination method according to the present invention.

Referring now to FIG. 4, the system operates according to the flowchart as shown. In step 50 a sensor receives a vibratory signal from the engine from which a determination of knock is to be made. The sensor converts the vibratory signal to an analog electrical signal which is sampled in step 52. In step 54 the sampled sensor signal is converted into numerical data preferably in the frequency domain.

The numerical data is then classified as to whether knock has occurred in step 56. If no knock is present in step 58, the sequence is returned to step 50. In step 58 if knock is present a severity of knock signal is output to the engine electronic engine control which is then sent to the engine control strategy in step 62. The engine control strategy is then modified to correct the spark knock in step 64. The engine control strategy may be modified in several ways including retarding the ignition point and/or making the air fuel mixture richer.

What is claimed is:

1. A system for detecting spark knock in an internal combustion engine comprising:

vibration detection means connected in proximity to the engine for converting a vibration into an electrical output signal representative of said vibration;

sampling means connected to said vibration detection means for sampling said electrical output signal and converting said electrical output signal into a digital data pattern corresponding to said electrical output signal;

feature extraction means connected to said sampling means for converting said digital data pattern into frequency domain signal values forming a frequency domain pattern, each value having a magnitude;

trained classification means connected to said feature extraction means for receiving said frequency domain pattern and having predetermined coefficients determined during training for classifying said frequency domain pattern to indicate the presence of spark knock.

2. A system for detecting spark knock as recited in claim 1 further comprising an output means for providing an electrical signal corresponding to said spark knock.

3. A system for detecting spark knock as recited in claim 2 wherein said output means further provides a signal corresponding to sensor failure.

4. A system for detecting spark knock as recited in claim 2 wherein said electrical signal is a digital signal indicating spark knock and no spark knock.

5. A system for detecting spark knock as recited in claim 2 further comprising an output means for providing an electrical signal corresponding to severity of spark knock.

6. A system for detecting spark knock as recited in claim 5 wherein said electrical signal is a serial signal.

7. A system for detecting spark knock as recited in claim 5 wherein said electrical signal is a pulse width modulated signal having a pulse width indicative of the severity of knock.

8. A system for detecting spark knock as recited in claim 5 wherein said electrical signal is an analog signal having an amplitude indicative of the severity of spark knock.

9. A system for detecting spark knock as recited in claim 5 wherein said electrical signal is frequency signal having an frequency indicative of the severity of spark knock.

10. A system for detecting spark knock as recited in claim 1 wherein said predetermined coefficients are multiplied by the magnitude of said frequency domain signals.

11. A system for detecting spark knock as recited in claim 1 wherein said sampling means sampling at a predetermined frequency, said predetermined frequency is continuously variable.

12. A system for detecting spark knock as recited in claim 1 wherein said sampling means sampling at a predetermined frequency, said predetermined frequency is constant.

13. A system for detecting spark knock as recited in claim 1 wherein the internal combustion engine comprises an engine block, said sensing means mounted within said engine block.

14. A system for detecting spark knock as recited in claim 1 wherein said engine comprises a predetermined number of cylinders, a respective sensing means being mounted in proximity to each respective cylinder.

15. A system for detecting spark knock in an internal combustion engine comprising:

engine control means for controlling the operation of the engine based on predetermined inputs;

sensing means connected in proximity of the engine for converting a vibratory waveform into an electrical output signal indicative of said vibratory waveform;

sampling means connected to said sensing means for sampling a portion of said electrical output signal and converting said electrical output signal into a digital data pattern;

trained classification means connected to said sampling means for receiving said digital data pattern from said sampling means and classifying said digital data pattern based on a plurality of trained coefficients; and output means connected to said trained classification means for providing an electrical signal for indicating the presence of spark knock to said engine control means so that the engine control means can adjust said predetermined outputs to eliminate spark knock.

16. A system for detecting spark knock as recited in claim 15 wherein said electrical signal provided to output means indicates severity of spark knock.

17. A system for detecting spark knock as recited in claim 15 wherein said output means further provides a signal corresponding to sensor failure.

18. Method of determining spark knock in an internal combustion engine comprising the steps of:

converting a vibratory waveform into an electrical output signal indicative of said vibratory waveform;

sampling and converting said electrical output signal into a digital data pattern;

converting said digital data pattern into frequency domain signal pattern;

classifying said frequency domain signal pattern based on a weighted coefficients using said frequency domain signal pattern and coefficients determined by training; and indicating the presence of spark knock based on said weighted calculation.

19. A method of determining spark knock as recited in claim 18 wherein said steps of sampling and converting are performed at fixed time intervals.

20. A method of determining spark knock as recited on claim 18 wherein said steps of sampling and converting are performed at variable time intervals.

* * * * *